(12) United States Patent
Tomita et al.

(10) Patent No.: US 8,377,998 B2
(45) Date of Patent: Feb. 19, 2013

(54) PROCESS FOR PRODUCING FLUOROPOLYMER, AND FLUORINATED ION EXCHANGE MEMBRANE

(75) Inventors: Toshinori Tomita, Tokyo (JP); Jumpei Nomura, Tokyo (JP); Junji Saito, Tokyo (JP); Yasuhiko Matsuoka, Tokyo (JP); Kazuo Umemura, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 150 days.

(21) Appl. No.: 12/893,068

(22) Filed: Sep. 29, 2010

(65) Prior Publication Data

US 2011/0015283 A1 Jan. 20, 2011

Related U.S. Application Data

(63) Continuation of application No. PCT/JP2009/058397, filed on Apr. 28, 2009.

(30) Foreign Application Priority Data

Apr. 28, 2008 (JP) ................................. 2008-117372

(51) Int. Cl.
*B01J 39/20* (2006.01)
(52) U.S. Cl. ............. 521/27; 521/38; 526/242; 526/247
(58) Field of Classification Search .................... 521/27, 521/38; 526/242, 247
See application file for complete search history.

(56) References Cited

U.S. PATENT DOCUMENTS

| | | | |
|---|---|---|---|
| 4,604,172 A | 8/1986 | Hengel | |
| 5,182,342 A | 1/1993 | Feiring et al. | |
| 7,838,608 B2 * | 11/2010 | Hintzer et al. ................. | 526/242 |
| 2006/0004129 A1 * | 1/2006 | Otozawa et al. ............... | 524/284 |
| 2008/0051479 A1 | 2/2008 | Luzinay et al. | |
| 2008/0275147 A1 | 11/2008 | Tayanagi et al. | |
| 2009/0306233 A1 * | 12/2009 | Umemura et al. ............... | 521/27 |

FOREIGN PATENT DOCUMENTS

| | | |
|---|---|---|
| CN | 1513601 A | 7/2004 |
| FR | 2 388 014 A1 | 11/1978 |
| FR | 2 876 694 A1 | 4/2006 |
| JP | 52-028586 | 3/1977 |
| JP | 1-24171 | 5/1989 |
| JP | 06-199958 | 7/1994 |
| JP | 6-199958 A | 7/1994 |

(Continued)

OTHER PUBLICATIONS

Extended Supplementary European Search Report issued on Jun. 7, 2011 in corresponding European Application No. 09 73 8839.

(Continued)

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

A polymerization medium having small ozone depletion potential and small global warming potential and having a small chain transfer constant is used, to efficiently produce a fluoropolymer having a high molecular weight and having excellent heat resistance, solvent resistance, chemical resistance, etc. A process for producing a fluoropolymer, which comprises polymerizing a fluoromonomer having a carboxylic acid type functional group and a fluoroolefin using a hydrofluorocarbon as a medium, wherein the hydrofluorocarbon as the medium has 4 to 10 carbon atoms and has a ratio (molar basis) of the number of hydrogen atoms/the number of fluorine atoms (H/F ratio) of from 0.05 to 20.

20 Claims, 1 Drawing Sheet

FOREIGN PATENT DOCUMENTS

| | | |
|---|---|---|
| JP | 2005-29704 | 2/2005 |
| JP | 2005-029704 | 2/2005 |
| JP | 2008-177167 | 7/2008 |
| WO | 2007/145181 | 12/2007 |
| WO | 2008/093570 | 8/2008 |

OTHER PUBLICATIONS

Chinese Office Action issued Feb. 23, 2012, in China Patent Applicatlion No. 200980115746.4 (with English Translation).

* cited by examiner

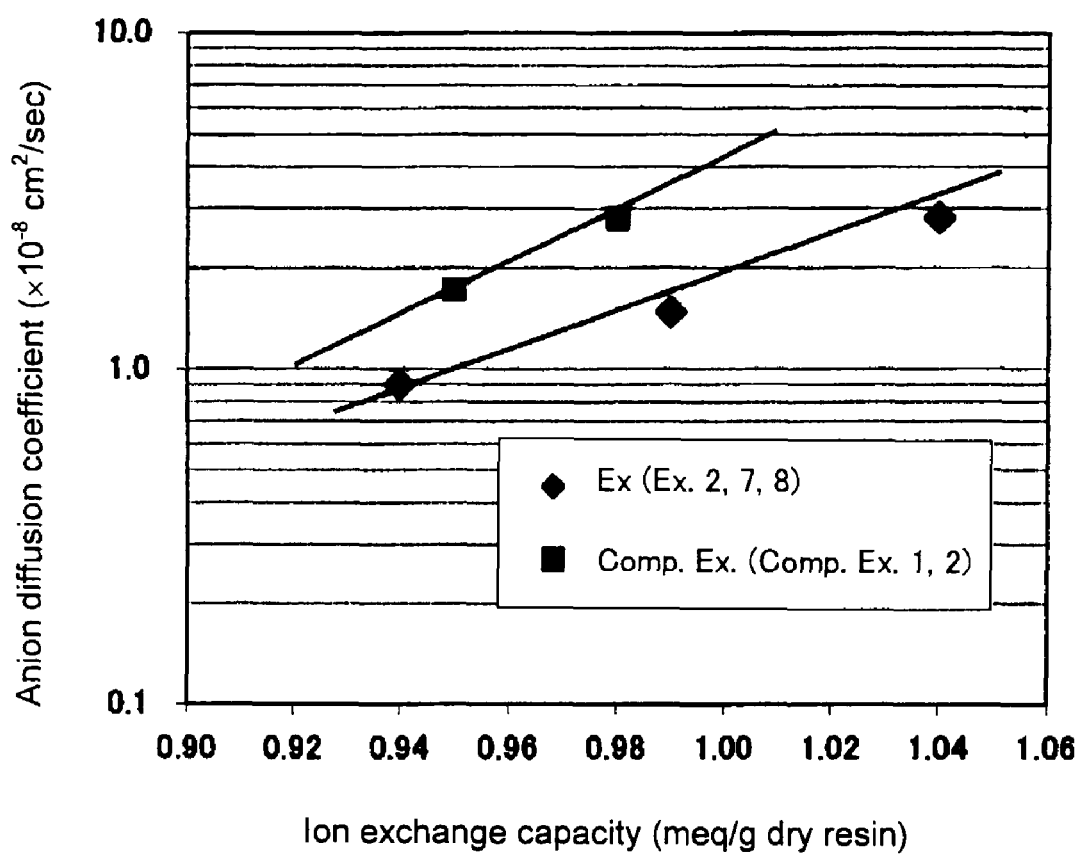

PROCESS FOR PRODUCING FLUOROPOLYMER, AND FLUORINATED ION EXCHANGE MEMBRANE

TECHNICAL FIELD

The present invention relates to a process for producing a fluoropolymer, more particularly, it relates to a production process for efficiently producing a fluoropolymer having excellent heat resistance, solvent resistance, chemical resistance, etc. and suitable for an ion exchange membrane by using a polymerization medium which is less likely to bring about environmental destruction. Further, the present invention relates to a fluorinated ion exchange membrane which comprises at least one layer of an ion exchange membrane made of a fluoropolymer having carboxylic acid type functional groups obtained by the above production process, and which achieves a high current efficiency.

BACKGROUND ART

Heretofore, as an ion exchange membrane to be used for salt electrolysis, a membrane made of a fluoropolymer having carboxylic acid type functional groups or sulfonic acid type functional groups has been known. Such a fluoropolymer is obtained by copolymerizing a fluoromonomer having a carboxylic acid type functional group such as a perfluorovinyl ether and a fluoroolefin such as tetrafluoroolefin ($CF_2=CF_2$).

As the copolymerization method, emulsion polymerization, suspension polymerization, solution polymerization or the like may be mentioned. Emulsion polymerization is carried out in an aqueous medium in the presence of a polymerization initiator and a perfluorocarboxylic acid type emulsifier (such as $C_7F_{15}CO_2NH_4$ or $C_8F_{17}CO_2NH_4$), but in recent years, there is concern about influences of such a perfluorocarboxylic acid type emulsifier on the environment.

Further, it has been known that in solution polymerization, as a polymerization medium, a perfluorocarbon such as perfluoromethylcyclohexane, 1,1,2-trichloro-1,2,2-trifluoroethane ($CCl_2F$—$CClF_2$) etc. can be used (for example, Patent Documents 1 and 2). However, such a solvent is likely to destroy the ozone layer in the atmosphere, and accordingly their use is limited.

On the other hand, a process has been proposed to produce a fluoropolymer by copolymerizing a vinyl ether having a functional group capable of being converted to a carboxylic acid group or a sulfonic acid group and tetrafluoroethylene using as a medium a hydrofluoro ether having small ozone depletion potential and small global warming potential (for example, Patent Document 3). However, a process for more efficiently producing a fluoropolymer useful as an ion exchange membrane, etc. has been desired.

Patent Document 1: JP-A-52-28586
Patent Document 2: JP-B-1-24171
Patent Document 3: JP-A-2005-29704

Problems to be Solved by the Invention

The object of the present invention is to provide a production process for efficiently producing a fluoropolymer having a high molecular weight and having excellent heat resistance, solvent resistance, chemical resistance, etc. by using a polymerization medium having small ozone depletion potential and small global warming potential and having small chain transfer constant.

Further, the present inventors have found the following. In a case where a monomer is dispersed in a medium with a low solubility to carry out polymerization, or in a case where an initiator is dispersed in a medium with a low solubility to carry out polymerization, the monomer concentration or the initiator concentration in the medium at the time of polymerization tends to be non-uniform, a polymer differing in the composition tends to form as the polymerization proceeds, and accordingly the distribution of the composition of the obtained polymer, that is the distribution of the ion exchange capacity (hereinafter referred to as the ion exchange capacity distribution) tends to be large. Particularly, in emulsion polymerization, droplets of the monomer are present, and the monomer is supplied from the droplets to the polymerization site where the initiator is present by dissolution or diffusion, and accordingly it tends to be difficult to control the monomer concentration during the reaction constant, whereby the ion exchange capacity distribution tends to be large.

Further, it is an object of the present invention to provide an ion exchange membrane which achieves a high current efficiency, obtained by the above production process.

Means to Solve the Problems

The process for producing a fluoropolymer of the present invention is a process for producing a fluoropolymer, which comprises polymerizing a fluoromonomer having at least one fluorine atom and having a carboxylic acid type functional group in its molecule and a fluoroolefin having at least one fluorine atom in its molecule using a hydrofluorocarbon as a medium, wherein the hydrofluorocarbon has 4 to 10 carbon atoms and has a ratio (molar basis) of the number of hydrogen atoms/the number of fluorine atoms of from 0.05 to 20.

Effects of the Invention

According to the present invention, a fluoropolymer having carboxylic acid type functional groups useful for an ion exchange membrane can stably and efficiently be produced by using a polymerization medium having small ozone depletion potential and small global warming potential and having a high polymerization rate, without using an emulsifier which may be subject to control. Further, according to the present invention, an ion exchange membrane for salt electrolysis comprising a fluoropolymer obtained by such a production process, which achieves a high current efficiency, can be obtained.

BRIEF DESCRIPTION OF THE DRAWING

FIG. 1 is a graph illustrating the relation between the ion exchange capacity of a fluoropolymer and an anion diffusion coefficient.

BEST MODE FOR CARRYING OUT THE INVENTION

The process for producing a fluoropolymer according to the present invention comprises polymerizing a fluoromonomer having a carboxylic acid type functional group and a fluoroolefin, using a hydrofluorocarbon as a polymerization medium, in this medium.

That is, the present invention provides the following [1] to [9].

[1] A process for producing a fluoropolymer, which comprises polymerizing a fluoromonomer having at least one fluorine atom and having a carboxylic acid type functional group in its molecule and a fluoroolefin having at least one fluorine atom in its molecule using a hydrofluorocarbon as a medium, wherein the hydrofluorocarbon has 4 to 10 carbon atoms and has a ratio (molar basis) of the number of hydrogen atoms/the number of fluorine atoms of from 0.05 to 20.

[2] The process for producing a fluoropolymer according to the above [1], wherein the fluoromonomer having a carboxylic acid type functional group is a perfluorovinyl ether represented by the following formula (1):

(1)

wherein each of X and X' which are independent of each other, is a fluorine atom (F) or a trifluoromethyl group ($CF_3$), A is a carboxylic acid type functional group, p is 0 or 1, q is an integer of from 0 to 12, r is an integer of from 0 to 3, s is 0 or 1, t is an integer of from 0 to 12, and u is an integer of from 0 to 3, provided that $1 \leq p+s$ and $1 \leq r+u$.

[3] The process for producing a fluoropolymer according to the above [1] or [2], wherein the fluoroolefin is tetrafluoroethylene.

[4] The process for producing a fluoropolymer according to any one of the above [1] to [3], wherein the hydrofluorocarbon is a compound represented by the formula $C_{n+m}F_{2n+1}H_{2m+1}$ (wherein n is an integer of from 2 to 8, and m is an integer of from 0 to 3).

[5] The process for producing a fluoropolymer according to any one of the above [1] to [4], wherein the hydrofluorocarbon is at least one member selected from the group consisting of 1,1,1,2,2,3,3,4,4,5,5,6,6-tridecafluorohexane, 1,1,1,2,2,3,3,4,4-nonafluorohexane and 1,1,1,2,2,3,3,4,4,5,5,6,6-tridecafluorooctane.

[6] The process for producing a fluoropolymer according to any one of the above [1] to [5], which has a continuous reaction step of successively adding the fluoromonomer having a carboxylic acid type functional group to the hydrofluorocarbon for reaction.

[7] The process for producing a fluoropolymer according to any one of the above [1] to [6], wherein the ion exchange capacity of the fluoropolymer is from 0.8 to 1.3 meq/g dry resin.

[8] A fluorinated ion exchange membrane, comprising a membrane made of a fluoropolymer having carboxylic acid type functional groups obtained by the production process as defined in any one of the above [1] to [7].

[9] The fluorinated ion exchange membrane according to the above [8], wherein the anion diffusion coefficient of the membrane made of a fluoropolymer having carboxylic acid type functional groups is from $1 \times 10^{-9}$ to $1 \times 10^{-7}$ cm$^2$/sec.

Now, the monomer components, the polymerization medium, the polymerization method and the fluoropolymer to be obtained in the production process of the present invention, the fluorinated ion exchange membrane comprising an ion exchange membrane made of the fluoropolymer, etc., are described in detail below.

[Fluoromonomer Having a Carboxylic Acid Type Functional Group]

In the present invention, the fluoromonomer having a carboxylic acid type functional group is not particularly limited so long as it is a compound having at least one fluorine atom and having an ethylenic double bond and having a carboxylic acid type functional group in its molecule, and a conventional compound may be used.

As a preferred example, a perfluorovinyl ether represented by the following formula (1) may be mentioned.

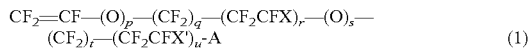

(1)

In the formula (1), each of X and X' which are independent of each other, is a fluorine atom (F) or a trifluruoromethyl group ($CF_3$). That is, each of X and X' is F or $CF_3$, and in a case where both X and X' are present in one molecule, they may be the same or different.

"A" is a carboxylic acid type functional group. The carboxylic acid type functional group is a carboxylic acid group (—COOH) itself or a functional group capable of being converted to a carboxylic acid group by hydrolysis or neutralization. Specifically, a functional group represented by —COOH, —CN, —COF, —COOR$^1$, —COOM or —COONR$^2$R$^3$ may be mentioned. In the formula, R$^1$ is a $C_{1-10}$ alkyl group, and each of R$^2$ and R$^3$ which are independent of each other, is a hydrogen atom or a $C_{1-10}$ alkyl group. R$^2$ and R$^3$ may be the same or different. M is an alkali metal or a quaternary ammonium salt group.

Further, in the formula (1), p is 0 or 1, q is an integer of from 0 to 12, r is an integer of from 0 to 3, s is 0 or 1, t is an integer of from 0 to 12, and u is an integer of from 0 to 3, provided that p and s, and r and u, are not simultaneously 0. That is, $1 \leq p+s$ and $1 \leq r+u$ are satisfied.

As specific examples of such a perfluorovinyl ether, compounds represented by the following formulae may be mentioned:

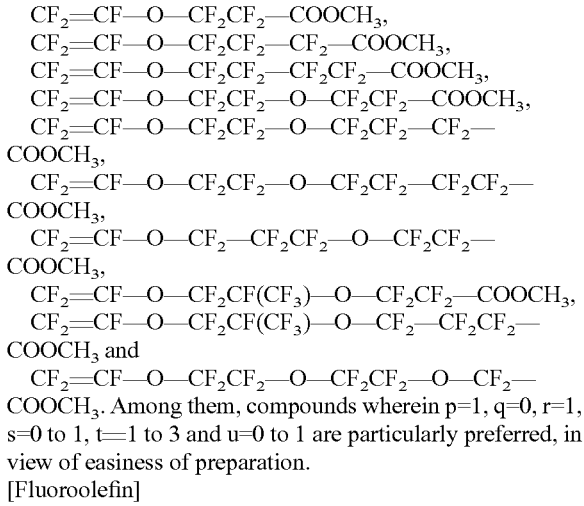

Among them, compounds wherein p=1, q=0, r=1, s=0 to 1, t=1 to 3 and u=0 to 1 are particularly preferred, in view of easiness of preparation.

[Fluoroolefin]

In the present invention, as the fluoroolefin, a fluoroolefin having 2 to 3 carbon atoms and having at least one fluorine atom in its molecule is used. As specific examples of a preferred fluoroolefin, tetrafluoroethylene (TFE) ($CF_2$=$CF_2$), chlorotrifluoroethylene (CTFE) ($CF_2$=CFCl), vinylidene fluoride (VDF) ($CF_2$=$CH_2$), a vinyl fluoride (VF) ($CH_2$=CHF) and hexafluoropropylene (HFP) ($CF_2$=$CFCF_3$) may be mentioned, and use of TFE is particularly preferred. Such fluoroolefins may be used alone or in combination of two or more.

[Other Monomer]

In the present invention, in addition to the fluoromonomer having a carboxylic acid type functional group and the fluoroolefin, other monomer may further be copolymerized. The copolymerazable monomer may, for example, be a vinyl monomer represented by the formula $CF_2$=$CF_2$—$R^f$ or $CF_2$=CF—$OR^f$ (in such formulae, $R^f$ is a $C_{1-10}$ perfluoroalkyl group), or a divinyl monomer represented by the formula $CF_2$=$CFO(CF_2)_vCF$=$CF_2$ (wherein v is an integer of from 1 to 3). By copolymerizing such a monomer, the flexibility and the mechanical strength of a membrane can be improved. The proportion of such a monomer component is preferably at most 30 mass % with a view to maintaining the ion exchange performance, more preferably at most 20 mass %.

[Polymerization Medium]

In the present invention, as a polymerization medium, a hydrofluorocarbon having 4 to 10 carbon atoms and having a ratio on molar basis of the number of hydrogen atoms/the number of fluorine atoms (hereinafter referred to as H/F) of from 0.05 to 20 is used. The molecular structure of the hydrofluorocarbon may be either linear or branched. If the number of carbon atoms of the hydrofluorocarbon is less than 4 or more than 10, the boiling point will be out of the desired temperature range (0 to 200° C., more preferably 10 to 100° C.), such being unfavorable. One having 4 to 8 carbon atoms is particularly preferred.

That is, if the number of carbon atoms of the hydrofluorocarbon is less than 4, the boiling point will be less than 0° C., whereby its storage and transport will be difficult, and on the other hand, if the number of carbon atoms is more than 10, the boiling point will be higher than 200° C., whereby separation and recovery of the solvent from a suspension after the polymerization will be difficult.

Further, the hydrofluorocarbon in the present invention is one having a H/F ratio of from 0.05 to 20. The H/F ratio is more preferably from 0.06 to 1. A hydrofluorocarbon having a H/F ratio lower than 0.05 will not sufficiently be soluble in an after-mentioned polymerization initiator. On the other hand, if the H/F ratio of the hydrofluorocarbon exceeds 20, the chain transfer constant of the polymerization reaction will be large, whereby no fluoropolymer having a desired molecular weight will be obtained.

As specific examples of such a hydrofluorocarbon, compounds represented by the following formulae may be mentioned:

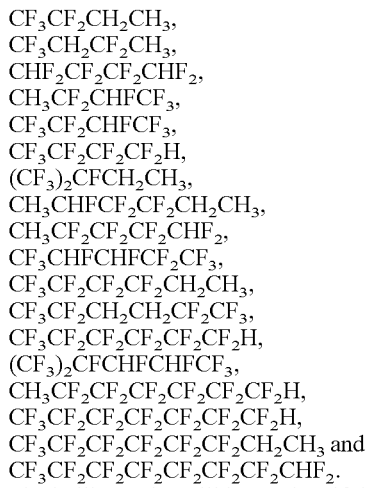

$CF_3CF_2CH_2CH_3$,
$CF_3CH_2CF_2CH_3$,
$CHF_2CF_2CF_2CHF_2$,
$CH_3CF_2CHFCF_3$,
$CF_3CF_2CHFCF_3$,
$CF_3CF_2CF_2CF_2H$,
$(CF_3)_2CFCH_2CH_3$,
$CH_3CHFCF_2CF_2CH_2CH_3$,
$CH_3CF_2CF_2CF_2CHF_2$,
$CF_3CHFCHFCF_2CF_3$,
$CF_3CF_2CF_2CF_2CH_2CH_3$,
$CF_3CF_2CH_2CH_2CF_2CF_3$,
$CF_3CF_2CF_2CF_2CF_2H$,
$(CF_3)_2CFCHFCHFCF_3$,
$CH_3CF_2CF_2CF_2CF_2CF_2CF_2H$,
$CF_3CF_2CF_2CF_2CF_2CF_2CF_2H$,
$CF_3CF_2CF_2CF_2CF_2CF_2CH_2CH_3$ and
$CF_3CF_2CF_2CF_2CF_2CF_2CF_2CHF_2$.

The boiling point will be too low if the number of carbon atoms is too small, and on the contrary, the boiling point will be too high if the number of carbon atoms is too large, and it will be difficult to obtain a high molecular weight copolymer if the number of hydrogen atoms is large. Accordingly, among the above compounds, particularly preferred is use of a hydrofluorocarbon represented by the formula $C_{n+m}F_{2n+1}H_{2m+1}$ (wherein n is an integer of from 2 to 8, and m is an integer of from 0 to 3). As particularly preferred hydrofluorocarbons, 1,1,1,2,2,3,3,4,4,5,5,6,6-tridecafluorohexane represented by the formula $CF_3CF_2CF_2CF_2CF_2CF_2H$ (H/F ratio: 0.076), 1,1,1,2,2,3,3,4,4-nonafluorohexane represented by the formula $CF_3CF_2CF_2CF_2CH_2CH_3$ (H/F ratio: 0.56) and 1,1,1,2,2,3,3,4,4,5,5,6,6-tridecafluorooctane represented by the formula $CF_3CF_2CF_2CF_2CF_2CF_2CH_2CH_3$ (H/F ratio: 0.38) may, for example, be mentioned.

The polymerization media may be used alone or in combination of two or more.

By use of the polymerization medium in the production process of the present invention, a fluoropolymer which achieves a high current efficiency when used as an ion exchange membrane will be obtained as compared with a fluoropolymer having the same ion exchange capacity.

[Polymerization Method]

In the present invention, it is preferred to carry out copolymerization reaction of the fluoromonomer with the fluoroolefin by controlling the amount of use of the hydrofluorocarbon as the polymerization medium to from 0.01 to 20 times, preferably from 0.05 to 10 times the mass of the fluoromonomer having a carboxylic acid type functional group. If the amount of use of the hydrofluorocarbon as the polymerization medium is too small, the polymerization reaction will not smoothly proceed. Further, if the amount of use of the hydrofluorocarbon is too large, the reaction apparatus will get larger or there is disadvantageous in operation such as separation and recovery of the polymer.

The ratio of use of the fluoromonomer having a carboxylic acid type functional group to the fluoroolefin is selected so that the polymer to be obtained has a desired copolymerization ratio. The above ratio is selected so that the copolymerization ratio of the fluoromonomer having a carboxylic acid type functional group is preferably from 15 to 95 mass %, more preferably from 20 to 80 mass %, most preferably from 20 to 60 mass %.

In the present invention, the respective monomers may be added all at once, or may be added successively or continuously for reaction. With a view to making the concentration of the monomers in the reaction system constant so as to make the composition of a copolymer to be formed uniform, it is preferred to successively add TFE and the fluoromonomer having a carboxylic acid type functional group to the polymerization system containing the hydrofluorocarbon as the polymerization medium for continuous reaction.

The method of successive addition is not particularly limited, and the addition ratio may be changed between at the initial stage of the polymerization and at the later stage of the polymerization, but with a view to making the composition of the polymer to be obtained uniform, it is preferred to make up for TFE and the fluoromonomer having a carboxylic acid type functional group consumed by the polymerization so as to maintain the concentration of the respective monomers in the polymerization system constant. Specifically, it is preferred to successively introduce TFE to maintain the pressure in the polymerization system constant and to successively add the fluoromonomer having a carboxylic acid type functional group in proportion to the amount of TFE introduced.

Even in polymerization in the uniform polymerization site such as solution polymerization, the monomer is consumed by the reaction and the monomer concentration is decreased, and accordingly the ion exchange capacity is decreased as the reaction proceeds, resulting in distribution of the composition of the polymer. However, by successively or continuously adding the respective monomers to carry out reaction while the concentrations of the monomers are controlled constant, the distribution of the composition in the obtained polymer, i.e. the distribution of the ion exchange capacity can be reduced.

The present inventors have found that when the ion exchange capacity distribution in the fluoropolymer obtained by the polymerization is smaller, the initial current efficiency is achieved even with a high ion exchange capacity, and a decrease in the performance such as the current efficiency by impurities such as iodine is reduced.

The reason why a decrease in the current efficiency by impurities can be suppressed when the ion exchange capacity distribution in the fluoropolymer having carboxylic acid type functional groups is smaller, is not clearly understood, but the present inventors consider as follows.

When the ion exchange capacity distribution is small, the distribution of the water content of the fluoropolymer is also small, and accordingly components having a water content higher than the optimum water content range are small even if the ion exchange capacity is high, whereby the initial current efficiency is high. Further, as the ion exchange capacity can be made high, components having a water content lower than the optimum water content range are small even if the water content is decreased by deposition of impurities, whereby a decrease in the current efficiency can be suppressed.

Further, in the present invention, the pressure in the polymerization reaction is preferably at least 0.05 MPaG (gauge pressure, the same applies hereinafter), more preferably at least 0.1 MPaG. If the pressure is too low, it will be difficult to maintain the polymerization reaction rate to a practically satisfiable rate, whereby a high molecular weight polymer is hardly obtained. Further, the polymerization pressure is preferably at most 2.0 MPaG.

In the polymerization reaction of the present invention, other conditions and operation are not particularly limited, and reaction conditions in a wide range can be employed. For example, as the temperature for the polymerization reaction, an optimum value is selected depending on the type of the monomer, the reaction molar ratio, etc. However, a reaction at a too high temperature or a too low temperature is industrially disadvantageous, and accordingly it is preferred to select the reaction temperature of from 20 to 90° C., more preferably from 30 to 80° C.

In the present invention, it is possible to initiate the polymerization by irradiation with ionizing radiation for example, but use of a polymerization initiator having high activity at the above-described preferred reaction temperature (20 to 90° C.) such as an azo compound or a peroxy compound is industrially advantageous.

As a polymerization initiator preferably used in the present invention, a diacyl peroxide such as disuccinic acid peroxide, benzoyl peroxide, lauroyl peroxide or bis(pentafluoropropionyl) peroxide; an azo compound such as 2,2'-azobis(2-amidinopropane)hydrochloride, 4,4'-azobis(4-cyanovaleic acid), dimethyl 2,2'-azobisisobutyrate or azobisisobutyronitrile; a peroxy ester such as t-butyl peroxyisobutyrate or t-butyl peroxypivalate; a peroxydicarbonate such as diisopropyl peroxydicarbonate or bis(2-ethylhexyl) peroxydicarbonate; or a hydroperoxide such as diisopropylbenzene hydroperoxide may, for example, be mentioned.

The amount of addition of such a polymerization initiator is preferably from 0.0001 to 3 parts by mass, more preferably from 0.0001 to 2 parts by mass per 100 parts by mass of all the monomers. By reducing the amount of addition of the polymerization initiator, the molecular weight of the polymer to be formed can be increased. In addition to the polymerization initiator, a molecular weight adjuster or the like to be used in conventional solution polymerization may be added.

[Post Processing]

After completion of the polymerization reaction, the obtained fluoropolymer can be agglomerated and separated by mixing with a medium in which the fluoropolymer is insoluble (hereinafter referred to as agglomeration medium). The agglomeration medium may be properly selected from aliphatic saturated hydrocarbon solvents such as pentane, hexane, cyclopentane and cyclohexane; alcohol solvents such as methanol; and halogenated solvents such as tetrachloromethane, dichloromethane, trichlorofluoromethane and dichlorofluoroethane ($CH_3CCl_2F$).

Mixing of the liquid after the reaction with the agglomeration medium may be carried out by adding the agglomeration medium to the liquid after the reaction with stirring, or by adding the liquid after the reaction to the agglomeration medium with stirring. As the agglomeration medium or the liquid after the reaction is added/mixed, the polymer is agglomerated and deposits as particles. The agglomerated particles are isolated by operation such as filtration, dried and then recovered.

Further, the fluoropolymer having carboxylic acid groups obtained by the polymerization reaction is easily hydrolyzed by water, and there may be a drawback in carrying out melt processing in some cases, and thus re-esterification by alcohol treatment may be carried out. On that occasion, an acidic catalyst such as sulfuric acid may be used. Further, it is possible to carry out re-esterification by treatment with trimethyl orthoformate or trimethyl orthoacetate instead of the alcohol treatment.

[Fluoropolymer]

When the fluoropolymer obtained by the present invention is used as an ion exchange membrane, the ion exchange capacity of the ion exchange membrane is selected from a wide range of from 0.5 to 2.0 meq/g dry resin. Further, a more preferred range of the ion exchange capacity of the fluoropolymer is from 0.8 to 1.3 meq/g dry resin. Even when the ion exchange capacity of the fluoropolymer to be obtained is increased, the molecular weight of the fluoropolymer can be increased, and accordingly mechanical properties and the durability of the fluoropolymer will not be decreased. The ion exchange capacity varies depending on the composition of the obtained fluoropolymer, and from the viewpoint of mechanical properties and electrochemical performance as an ion exchange membrane, the ion exchange capacity is preferably at least 0.6 meq/g dry resin, particularly preferably at least 0.7 meq/g dry resin. Further, from the same viewpoint, the ion exchange capacity of the fluoropolymer used as an ion exchange membrane is more preferably at least 0.8 meq/g dry resin, most preferably at least 0.9 meq/g dry resin.

When the ion exchange capacity is larger than this range, the water content is appropriately high, the ion exchange groups can sufficiently be ionized, whereby the anions can sufficiently be excluded, thus leading to a high current efficiency.

Further, in view of the current efficiency and caustic properties produced, the range of the ion exchange capacity of the fluoropolymer used as an ion exchange membrane is preferably at most 1.3 meq/g dry resin, more preferably at most 1.2 meq/g dry resin.

When the ion exchange capacity is smaller than this range, the water content is appropriately low, and the ion exchange group concentration in the membrane is appropriately high, whereby the anions can sufficiently be excluded, thus leading to a high current efficiency.

The molecular weight of the fluoropolymer obtained by the present invention relates to the mechanical performance as an ion exchange membrane and film formation properties and is thereby very important. The molecular weight of the fluoropolymer is preferably at least 150° C. by the "TQ" value in view of high mechanical strength of the ion exchange membrane and favorable film formation properties. The "TQ" value is more preferably from 170 to 340° C., particularly preferably from 170 to 300° C. The "TQ" value is a value relating with the molecular weight of a polymer and is represented by the temperature at which the volume flow rate becomes 100 $mm^3$/sec. The volume flow rate means the amount of a polymer extruded represented by the unit of $mm^3$/sec, for example, when the polymer is melt-extruded from an orifice (diameter: 1 mm, length: 1 mm) at a constant temperature under a pressure of 3 MPa. The "TQ" value is an index for the molecular weight of a polymer, and the higher the "TQ" value, the higher the molecular weight.

The molecular weight of the fluoropolymer is low when the amount of a chain transfer component present in the system during the polymerization reaction is large, and is high if the amount is small. As described above, the fluorocopolymer of the present invention preferably has a certain molecular weight or higher, in view of high mechanical performance and favorable membrane formation properties. By using the polymerization medium in the production process of the present invention, the chain transfer properties of the polymerization medium itself are low, whereby a fluoropolymer having a sufficiently high molecular weight can be obtained.

[Ion Exchange Membrane]

By forming the fluoropolymer obtained by the present invention into a membrane, an ion exchange membrane can be obtained. The process for producing an ion exchange membrane comprises a step of forming the obtained fluoropolymer into a membrane, and a step of converting carboxylic acid type functional groups in the obtained fluoropolymer to carboxylic acid groups by hydrolysis. Either of the above step of membrane formation and step of conversion to carboxylic acid groups may be carried out first, but usually hydrolysis is carried out preferably after membrane formation.

The ion exchange membrane of the present invention has such an advantage as a small anion diffusion coefficient. The anion diffusion coefficient is a constant of proportionality in diffusion of anions when anions at different concentrations are disposed on both sides of a membrane, and the larger the diffusion coefficient, the larger the amount of diffusion of anions per unit area per unit time.

The current efficiency of an ion exchange membrane is low when the movement amount of hydroxide ions is large, and the movement amount of hydroxide ions at the time of electrolysis and the amount of diffusion of hydroxide ions in a state where there is no electric field are correlated with each other, and there is such a relation that when the anion diffusion coefficient is large, the movement of hydroxide ions at the time of electrolysis is large, and the current efficiency is low. Accordingly, at the same ion exchange capacity, a polymer having a smaller anion diffusion coefficient is considered to be a polymer having a higher current efficiency.

The ion exchange capacity means an average of the ion exchange capacities of the entire fluoropolymer, and the current efficiency is considered to be influenced not only by the ion exchange capacity but also by the ion exchange capacity distribution, and the current efficiency is considered to vary depending on the ion exchange capacity distribution even at the same ion exchange capacity. Further, as described above, the ion exchange capacity distribution is considered to have influence also over a decrease in the performance such as the current efficiency by impurities.

By decreasing the anion diffusion coefficient, a high current efficiency can be achieved, and a decrease in the performance such as the current efficiency by impurities can be suppressed. The anion diffusion coefficient is preferably at most $1 \times 10^{-7}$ cm$^2$/sec, more preferably at most $5 \times 10^{-8}$ cm$^2$/sec. If the anion diffusion coefficient is smaller than this range, the current efficiency of the ion exchange membrane is sufficiently high. Further, the anion diffusion coefficient is preferably at least $1 \times 10^{-9}$ cm$^2$/sec, more preferably at least $5 \times 10^{-9}$ cm$^2$/sec. When it is larger than this range, the electrolysis voltage will be sufficiently low.

The ion exchange capacity and the anion diffusion coefficient are confirmed to be in correlation with each other as shown in FIG. 1, and it is found that an ion exchange membrane made of a fluoropolymer obtained by the production process of the present invention has a small anion diffusion coefficient even at the same current efficiency, whereby a high current efficiency can be achieved.

Further, a membrane made of a fluoropolymer obtained by the production process of the present invention may be used as an ion exchange membrane in the form of a single membrane, or may be used as an ion exchange membrane as laminated on a membrane having a different ion exchange capacity or a membrane or a reinforced fabric having different functional groups such as sulfonic acid groups. Further, the membrane may be reinforced by cloth, fiber, non-woven fabric or the like. The ion exchange membrane made of the fluoropolymer of the present invention obtained as a single membrane or as a laminate can be used for diffusion dialysis, ozone-generating electrolysis, electrolytic reduction, a diaphragm for a fuel cell, a polymer catalyst, etc., and particularly, suitable used for electrolysis of an alkali hydroxide such as sodium chloride.

EXAMPLES

Now, the present invention will be described in further detail with reference to Examples. However, the present invention is by no means restricted to the following Examples.

In the following Examples, 1,1,1,2,2,3,3,4,4,5,5,6,6-tridecafluorohexane will be referred to as C6H, 1,1,1,2,2,3,3,4,4-nonafluorohexane as C4 ethane and 1,1,1,2,2,3,3,4,4,5,5,6,6-tridecafluorooctane as C6 ethane.

<Evaluation of TQ Value and Ion Exchange Capacity of Fluoropolymer>

In the following Examples and Comparative Examples, the "TQ" value is a temperature at which the volume flow rate "Q" value becomes 100 mm$^3$/sec. The volume flow rate is an extruded amount represented by the unit of mm$^3$/sec when a fluoropolymer is melt-extruded from an orifice (diameter: 1 mm, length: 1 mm) at a constant temperature under a pressure of 3 MPaG using a Shimadzu flow tester CFD-100D (manufactured by Shimadzu Corporation).

Further, measurement of the ion exchange capacity was carried out by the following method. That is, 0.7 g of a fluoropolymer obtained by polymerization was put in a tube made of a polycarbonate, and 5 mL of a 0.1N NaOH aqueous solution was added. The tube was left at rest at 60° C. for 18 hours to completely convert carboxylic acid type functional groups in the fluoropolymer to Na type, and then this solution was subjected to back titration with a 0.1N hydrochloric acid aqueous solution to determine the amount of NaOH in the solution thereby to calculate the ion exchange capacity of the fluoropolymer.

<Evaluation of Anion Diffusion Coefficient of Membrane Made of Fluoropolymer>

Measurement of the anion exchange diffusion coefficient was carried out by the following method. That is, a fluoropolymer obtained by polymerization was pressed at a temperature higher than TQ by 10° C. by flat plate pressing to obtain a film having a thickness of from 100 to 200 μm. Hereinafter this film will be referred to as a pressed film. This pressed film was immersed in a liquid having a composition of DMSO/KOH/H$_2$O=30/15/65 (mass %) at 95° C. for one hour for hydrolysis. The pressed film was washed with water for 30 minutes and further immersed in a 12 mass % NaOH aqueous solution at 90° C. for 16 hours to obtain a membrane of a fluoropolymer having carboxylic acid sodium salt type functional groups.

After the thickness (x cm) of the membrane was measured, the membrane was sandwiched in a cell made of PTFE (polytetrafluoroethylene) having an aperture area S of 0.785 cm$^2$ and a liquid capacity of 30 cm$^3$, one side of the cell compartmentalized by the membrane was filled with 3.39 mol/L NaOH, the other side was filled with a mixed solution of 2.89 mol/L NaOH and 0.5 mol/L NaCl, and both the OH ion concentration difference and the Cl ion concentration difference between both sides of the membrane were adjusted to a concentration difference $\Delta C=0.0005$ mol/cm$^3$. Then, the cell was lidded to prevent evaporation of water, and the liquid temperature was raised to 90° C. One hour later after the temperature reached 90° C., the liquid was withdrawn, and the liquid in each side of the membrane was exchanged with a solution having the same composition as that before the temperature was raised, preliminarily heated at 90° C., and the temperature was maintained at 90° C. again for 4 hours (t=14,400 seconds). 4 Hours later, the solution in the side in which the 3.39 mol/L NaOH was charged was sampled, the weight (w g) of the sample liquid was measured, and the NaCl concentration (C mol/g) in the sample liquid was measured by mercury thiocyanate method (colorimetric method).

The anion diffusion coefficient D (cm$^2$/sec) of the membrane prepared from the obtained fluoropolymer was calculated by the following formula in accordance with Fick's First Law:

$$D=Cwx/\Delta CSt$$

<Preparation and Evaluation of Ion Exchange Membrane>

A fluoropolymer S (hereinafter referred to as polymer S) having an ion exchange capacity of 1.10 meq/g dry resin and a TQ of 235° C. comprising a copolymer of TFE and a perfluorovinyl ether compound having a sulfonic acid type functional group represented by the formula $CF_2=CFOCF_2CF(CF_3)OCF_2CF_2SO_2F$ was prepared.

A fluoropolymer (hereinafter referred to as polymer C) having carboxylic acid type functional groups obtained in each of Examples and Comparative Examples and polymer S were subjected to coextrusion to obtain film A of a two layer structure comprising a layer of polymer C having a thickness of 18 μm and a layer of polymer S having a thickness of 65 μm. Further, polymer S was subjected to melt-extrusion to obtain film B having a thickness of 30 μm.

Further, monofilament polytetrafluoroethylene (PTFE) yarns obtained by rapidly stretching a PTFE film, followed by slitting into 100 denier, and multifilament polyethylene terephthalate (PET) yarns obtained by drawing and twisting six PET filaments of 5 denier, were subjected to plain weaving in an alternating arrangement of two PET yarns to one PTFE yarn, to obtain a reinforcing woven fabric having a yarn density of 30 yarns/cm. This woven fabric was flattened by a roll press so that the thickness of the woven fabric became about 80 μm.

The woven fabric and film thus obtained were overlaid in the order of film B, the woven fabric, film A (so that the layer of polymer C would be on the after-mentioned releasing PET film side) and a releasing PET film (thickness: 100 μm) and laminated by means of rollers. Then, the releasing PET film was peeled to obtain a reinforced laminated membrane.

Then, a paste comprising 29.0 wt % of zirconium oxide having an average particle size of 1 μm, 1.3 wt % of methyl cellulose, 4.6 wt % of cyclohexanol, 1.5 wt % of cyclohexane, and 63.6 wt % of water, was transferred by a roll press on the film B side of the laminated membrane to attach a gas-releasing covering layer. The attached amount of zirconium oxide at that time was 20 g/m$^2$.

Then, $CO_2CH_3$ groups and $SO_2F$ groups were hydrolyzed to be converted to ion exchange groups by immersion in an aqueous solution containing 30 wt % of dimethylsulfoxide and 15 wt % of potassium hydroxide at 95° C. for 10 minutes.

Further, a dispersion having 13 wt % of zirconium oxide having an average particle size of 1 μm dispersed in an ethanol solution containing 2.5 wt % of an acid-form polymer of polymer S, was prepared, and this dispersion was sprayed to the film A side of the above laminated membrane to attach a gas-releasing covering layer. The attached amount of zirconium oxide at that time was 3 g/m$^2$.

The fluorinated cation exchange membrane thus obtained was disposed in an electrolytic cell so that film A faced the cathode, and electrolysis of a sodium chloride aqueous solution was carried out. An electrolytic cell having an effective current-carrying area of 25 cm$^2$ was employed, wherein the inlet of water to be supplied to the cathode compartment was disposed at a lower part of the cathode compartment, and the outlet of the formed sodium hydroxide aqueous solution was disposed at an upper part of the cathode compartment, the inlet of a sodium chloride aqueous solution to the anode compartment was disposed at a lower part of the anode compartment, and the outlet of the sodium chloride aqueous solution diluted by the reaction was disposed at an upper part of the anode compartment. As the anode, one having a titanium punched metal (short diameter: 4 mm, long diameter: 8 mm) coated with a solid solution of ruthenium oxide, iridium oxide and titanium oxide, was used, and as the cathode, one having ruthenium-containing Raney Nickel electrically deposited on a SUS304 punched metal (short diameter: 5 mm, long diameter: 10 mm) was used.

Further, for the electrolysis of the sodium chloride aqueous solution, the electrolysis was carried out for one week by bringing the cathode side in an pressurized state so that the anode and the membrane would be in contact with each other, while supplying a 290 g/L aqueous sodium chloride solution and water to the anode compartment and the cathode compartment, respectively, and maintaining the sodium chloride concentration discharged from the anode compartment to be 190 g/L and the sodium hydroxide concentration discharged from the cathode compartment to be 32 wt %, under such conditions that the temperature would 80° C. and the current density was 6 kA/m$^2$, whereby the current efficiency one week later was measured. Then, the sodium chloride aqueous solution to be supplied was changed to a 290 g/L sodium chloride aqueous solution containing 20 ppm of iodine ions and 1 ppm of barium ions, and the electrolysis was further carried out, and the current efficiency 10 days after the change was measured.

Polymerization Reaction and Evaluation of Obtained Fluoropolymer

Example 1

A stainless steel reactor (autoclave) having an internal capacity of 0.2 liter (L) was evacuated of air, and in the reactor, a solution obtained by dissolving 37.2 mg of dimethyl-2,2'-azobisisobutyrate as a polymerization initiator in 59.2 g of C6H ($CF_3CF_2CF_2CF_2CF_2CF_2H$, H/F ratio: 0.076) as a polymerization medium, and 70.4 g of a perfluorovinyl ether compound having a carboxylic acid type functional group represented by the formula $CF_2=CFOCFCF(CF_3)OCF_2CF_2COOCH_3$ were sucked and injected.

Then, to this reactor, tetrafluoroethylene (TFE) was introduced until the pressure in the reactor became 0.1 MPaG (gauge pressure), and the reactor was heated so that the temperature in the reactor became 60° C. After the temperature in the reactor was stabilized at 60° C., TFE was further introduced until the pressure became 1.20 MPaG, and the reaction was initiated. During the reaction, TFE was continuously introduced so as to maintain the pressure under 1.20 MPaG. When the amount of TFE introduced from the initiation of the reaction reached 18 g, unreacted TFE was discharged out of the system to complete the polymerization. To the slurry thus obtained, methanol was added to agglomerate and separate a polymer, which was then washed and dried to obtain a powder of a fluoropolymer.

Of the obtained fluoropolymer, the ion exchange capacity was 0.86 meq/g dry resin, and the TQ value was 247° C.

Example 2

A stainless steel reactor (autoclave) having an internal capacity of 1 liter (L) was evacuated of air, and in the reactor, 315 g of C6H ($CF_3CF_2CF_2CF_2CF_2CF_2H$, H/F ratio: 0.076) as a polymerization medium and 174 g of perfluorovinyl ether compound having a carboxylic acid type functional group represented by the formula $CF_2=CFOCF_2CF_2CF_2COOCH_3$ were respectively sucked and injected.

Then, TFE was introduced until the pressure in the reactor became 0.1 MPaG (gauge pressure), and the reactor was heated so that the temperature in the reactor became 70° C. After the temperature in the reactor was stabilized at 70° C., TFE was introduced until the pressure became 1.22 MPaG, and 63 g of a 0.38 mass % medium ($CF_3CF_2CF_2CF_2CF_2CF_2H$) solution of azobisisobutylonitrile as a polymerization initiator was injected and added in the reactor to initiate the reaction.

During the reaction, TFE was continuously introduced so as to maintain the pressure under 1.22 MPaG. Further, 10 g of a perfluorovinyl ether compound represented by the formula $CF_2=CFOCF_2CF_2CF_2COOCH_3$ was successively added in proportion to the amount of introduction of TFE based on the amount of introduction of TFE of 9 g. When the amount of introduction of TFE from the initiation of the reaction reached 76 g, unreacted TFE was discharged out of the system to complete the polymerization. To the slurry thus obtained, methanol was added to agglomerated and separate a polymer, which was then washed and dried to obtain a powder of a fluoropolymer.

Of the obtained fluoropolymer, the ion exchange capacity was 0.94 meq/g dry resin, and the TQ value was 252° C. Further, the anion discharge coefficient of the pressed film was $8.98 \times 10^{-9}$ $cm^2$/sec.

Example 3

A stainless steel reactor (autoclave) having an internal capacity of 0.2 liter (L) was evacuated of air, and in the reactor, a solution obtained by dissolving 45.2 mg of azobisisobutylonitrile as a polymerization initiator in 69.3 g of C6H ($CF_3CF_2CF_2CF_2CF_2CF_2H$, H/F ratio: 0.076) as a polymerization medium, and 53.7 g of a perfluorovinyl ether compound having a carboxylic acid type functional group represented by the formula $CF_2=CFOCF_2CF_2CF_2OCF_2CF_2COOCH_3$ were sucked and injected.

Then, TFE was introduced until the pressure in the reactor became 0.1 MPaG (gauge pressure), and the reactor was heated so that the temperature in the reactor became 70° C. After the temperature in the reactor was stabilized at 70° C., TFE was further introduced until the pressure became 0.97 MPaG, and the reaction was initiated. Further, 4 g of a perfluorovinyl ether compound represented by the formula $CF_2=CFOCF_2CF_2CF_2OCF_2CF_2COOCH_3$ was successively added in proportion to the amount of introduction of TFE based on the amount of introduction of TFE of 2 g. When the amount of introduction of TFE from the initiation of the reaction reached 7 g, unreacted TFE was discharged out of the system, to complete the polymerization. To the slurry thus obtained, methanol was added to agglomerate and separate a polymer, which was then washed and dried to obtain a powder of a fluoropolymer.

Of the obtained fluoropolymer, the ion exchange capacity was 0.97 meq/g dry resin, and the TQ value was 208° C.

Example 4

A stainless steel reactor (autoclave) having an internal capacity of 0.2 liter (L) was evacuated of air, and in the reactor, a solution obtained by dissolving 61 mg of azobisisobutylonitrile as a polymerization initiator in 103.8 g of C6H ($CF_3CF_2CF_2CF_2CF_2CF_2H$, H/F ratio: 0.076), and 38.6 g of a perfluorovinyl ether compound having a carboxylic acid type functional group represented by the formula $CF_2=CFOCF_2CF_2CF_2COOCH_3$ were sucked and injected.

Then, TFE was introduced until the pressure in the reactor became 0.1 MPaG (gauge pressure), and the reactor was heated so that the temperature in the reactor became 70° C. After the temperature in the reactor was stabilized at 70° C., TFE was further introduced until the pressure became 1.05 MPaG, and the reaction was initiated. When the amount of introduction of TFE from the initiation of the reaction reached 14 g, unreacted TFE was discharged out of the system, to complete the polymerization. To the slurry thus obtained, methanol was added to agglomerate and separate a polymer, which was then washed and dried to obtain a powder of a fluoropolymer.

Of the obtained fluoropolymer, the ion exchange capacity was 0.93 meq/g dry resin, and the TQ value was 244° C.

Example 5

A stainless steel reactor (autoclave) having an internal capacity of 0.2 liter (L) was evacuated of air, and in the reactor, a solution obtained by dissolving 61 mg of azobisisobutylonitrile as a polymerization initiator in 88.0 g of C4 ethane ($CF_3CF_2CF_2CF_2CH_2CH_3$, H/F ratio: 0.56) as a polymerization medium, and 38.6 g of a perfluorovinyl ether compound having a carboxylic acid type functional group represented by the formula $CF_2=CFOCF_2CF_2CF_2COOCH_3$ were sucked and injected.

Then, TFE was introduced until the pressure in the reactor became 0.1 MPaG (gauge pressure), and the reactor was heated so that the temperature in the reactor became 70° C. After the temperature in the reactor was stabilized at 70° C., TFE was further introduced until the pressure became 1.05 MPaG, and the reaction was initiated. When the amount of introduction of TFE from the initiation of the reaction reached 8 g, unreacted TFE was discharged out of the system, to complete the polymerization. To the slurry thus obtained, methanol was added to agglomerate and separate a polymer, which was then washed and dried to obtain a powder of a fluoropolymer.

Of the obtained fluoropolymer, the ion exchange capacity was 0.92 meq/g dry resin, and the TQ value was 201° C.

Example 6

A stainless steel reactor (autoclave) having an internal capacity of 0.2 liter (L) was evacuated of air, and in the reactor, a solution obtained by dissolving 61 mg of azobisisobutylonitrile as a polymerization initiator in 96.6 g of C6 ethane ($CF_3CF_2CF_2CF_2CF_2CH_2CH_3$, H/F ratio: 0.38) as a polymerization medium, and 38.6 g of a perfluorovinyl ether compound having a carboxylic acid type functional group represented by the formula $CF_2$=$CFOCF_2CF_2CF_2COOCH_3$ were sucked and injected.

Then, TFE was introduced until the pressure in the reactor became 0.1 MPaG (gauge pressure), and the reactor was heated so that the temperature in the reactor became 70° C. After the temperature in the reactor was stabilized at 70° C., TFE was further introduced until the pressure became 1.05 MPaG, and the reaction was initiated. When the amount of introduction of TFE from the initiation of the reaction reached 9 g, unreacted TFE was discharged out of the system, to complete the polymerization. To the slurry thus obtained, methanol was added to agglomerate and separate a polymer, which was then washed and dried to obtain a powder of a fluoropolymer.

Of the obtained fluoropolymer, the ion exchange capacity was 0.95 meq/g dry resin, and the TQ value was 191° C.

Example 7

The same operation as in Example 2 was carried out except that the polymerization pressure was changed to 1.18 MPaG. Of the obtained fluoropolymer, the ion exchange capacity was 0.99 meq/g dry resin, and the TQ value was 242° C. Further, the anion discharge coefficient of the pressed film was $1.47 \times 10^{-8}$ cm$^2$/sec.

Example 8

The same operation as in Example 2 was carried out except that the polymerization pressure was changed to 1.12 MPaG. Of the obtained fluoropolymer, the ion exchange capacity was 1.04 meq/g dry resin, and the TQ value was 230° C. Further, the anion discharge coefficient of the pressed film was $2.83 \times 10^{-8}$ cm$^2$/sec.

Example 9

A stainless steel reactor (autoclave) having an internal capacity of 1 liter (L) was evacuated of air, and in the reactor, 315 g of C6H ($CF_3CF_2CF_2CF_2CF_2CF_2H$, H/F ratio: 0.076) and 177 g of a perfluorovinyl ether compound having a carboxylic acid type functional group represented by the formula $CF_2$=$CFOCF_2CF_2CF_2COOCH_3$ were respectively sucked and injected.

Then, TFE was introduced until the pressure in the reactor became 0.1 MPaG (gauge pressure), and the reactor was heated so that the temperature in the reactor became 70° C. After the temperature in the reactor was stabilized at 70° C., TFE was introduced until the pressure became 1.18 MPaG, and 63 g of a 0.38 mass % medium ($CF_3CF_2CF_2CF_2CF_2CF_2H$) of azobisisobutylonitrile as a polymerization initiator was further injected and added to initiate the reaction During the reaction, TFE was continuously introduced so as to maintain the pressure under 1.18 MPaG. Further, 3.7 g of a perfluorovinyl ether compound represented by the formula $CF_2$=$CFOCF_2CF_2CF_2COOCH_3$ was successively added in proportion to the amount of introduction of TFE based on the amount of introduction of TFE of 9 g. When the amount of introduction of TFE from the initiation of the reaction reached 18 g, unreacted TFE was discharged out of the system to complete the polymerization. To the slurry thus obtained, methanol was added to agglomerate and separate a polymer, which was then washed and dried to obtain a powder of a fluoropolymer.

Further, in the same polymerization as above, polymerization was completed when the amount of introduction of TFE reached 54 g or 90 g, followed by the same treatment after the reaction as above to obtain powders of a fluoropolymer. The ion exchange capacities of the obtained respective fluoropolymers were measured, whereupon the ion exchange capacities were 0.95 meq/g dry resin with respect to any of the fluoropolymers obtained in cases of the amount of introduction of TFE of 18 g, 54 g and 90 g, respectively, whereupon no change in the ion exchange capacity depending on the amount of introduction of TFE was observed.

Example 10

A stainless steel reactor (autoclave) having an internal capacity of 20 liter (L) was evacuated of air, and in the reactor, 8,607 g of C6H ($CF_3CF_2CF_2CF_2CF_2CF_2H$, H/F ratio: 0.076) as a polymerization medium and 4,586 g of a perfluorovinyl ether compound having a carboxylic acid type functional group represented by the formula $CF_2$=$CFOCF_2CF_2CF_2COOCH_3$ were respectively sucked and injected.

Then, TFE was introduced until the pressure in the reactor became 0.1 MPaG (gauge pressure), and the reactor was heated so that the temperature in the reactor became 70° C. After the temperature in the reactor was stabilized at 70° C., TFE was introduced until the pressure became 1.09 MPaG, and 1,169 g of a 0.38 mass % medium ($CF_3CF_2CF_2CF_2CF_2CF_2H$) of azobisisobutylonitrile as a polymerization initiator was further injected and added to the reactor to initiate the reaction.

During the reaction, TFE was continuously introduced so as to maintain the pressure under 1.09 MPaG. Further, 80 g of a perfluorovinyl ether compound represented by the formula $CF_2$=$CFOCF_2CF_2CF_2COOCH_3$ was successively added in proportion to the amount of introduction of TFE based on the amount of introduction of TFE of 179 g. When the amount of introduction of TFE from the initiation of the reaction reached 1,635 g, unreacted TFE was discharged out of the system to complete the polymerization. To the slurry thus obtained, methanol was added to agglomerate and separate a polymer, which was then washed and dried to obtain a powder of a fluoropolymer. Of the obtained fluoropolymer, the ion exchange capacity was 1.02 meq/g dry resin, and the TQ value was 232° C.

Further, an ion exchange membrane was prepared and evaluated by the above method using the obtained fluoropolymer, whereupon the current efficiency one week after initiation of the electrolysis was 96.4%. Then, the sodium chloride aqueous solution was changed to the above sodium chloride aqueous solution containing iodine ions and barium ions, and electrolysis was carried out for ten days, whereupon the current efficiency was 95.8%.

Comparative Example 1

A stainless steel autoclave having an internal capacity of 1 L was evacuated of air, and in the autoclave, 174 g of a perfluorovinyl ether compound having a carboxylic acid type functional group represented by the formula $CF_2$=$CFOCF_2CF_2CF_2COOCH_3$ and 306 g of AE-3000 (tradename, manufactured by Asahi Glass Company, Limited, $CF_3CH_2OCF_2CHF_2$) were sucked and injected, TFE was introduced to 0.1 MPaG, and the autoclave was heated to an internal temperature of 70° C. After the internal temperature was stabilized at 70° C., TFE was further introduced to 1.17 MPaG, and 28 g of a 0.85 mass % AE-3000 solution of AIBN (azobisisobutylonitrile) was injected and added to the autoclave to initiate the reaction. During the reaction, tetrafluoroethylene was continuously introduced so as to maintain the pressure under 1.22 MPaG. Further, 10 g of a perfluorovinyl ether compound having a carboxylic acid type functional group represented by the formula $CF_2=CFOCF_2CF_2CF_2COOCH_3$ was successively added in proportion to the amount of introduction of TFE based on the amount of introduction of tetrafluoroethylene of 9 g, and when the amount of introduction of TFE from the initiation of the reaction reached 73 g, unreacted TFE was discharged out of the system to complete the polymerization.

AE-3000 was added in an amount of half the weight of the obtained slurry, followed by dispersion by stirring, and the dispersion was put in methanol in an amount of 5 times the amount of added AE-3000 to agglomerate a polymer. The polymer after agglomeration was collected by filtration and washed with methanol. Then, the polymer was dried at 80° C. for 16 hours in vacuum to obtain a powder of a fluoropolymer. Of the obtained fluoropolymer, the ion exchange capacity was 0.95 meq/g dry resin, and TQ was 245° C. Further, the anion discharge coefficient of the pressed film was $1.72 \times 10^{-8}$ $CM^2$/sec.

Comparative Example 2

The same operation as in Comparative Example 1 was carried out except that the polymerization pressure was changed to 1.12 MPaG. Of the obtained fluoropolymer, the ion exchange capacity was 0.98 meq/g dry resin, and the TQ value was 241° C. Further, the anion discharge coefficient of the pressed film was $2.80 \times 10^{-8}$ $cm^2$/sec.

Comparative Example 3

8.6 g of $C_8F_{17}COONH_4$, 5.0 g of sodium dihydrogen phosphate and 8.6 g of disodium hydrogen phosphate were put in a stainless steel autoclave having an internal capacity of 2.5 L, the autoclave was evacuated of air, and 1,695 g of deionized water, 258 g of $CF_2=CFOCF_2CF_2CF_2CO_2CH_3$, 0.28 g of n-hexane and 5.2 g of a 0.12 mass % aqueous solution of copper sulfate dodecahydrate were sucked and injected. Then, TFE was introduced until the pressure became 0.01 MPa, and the autoclave was heated so that the temperature in the autoclave became 50° C. After the internal temperature reached 50° C., TFE was further introduced to 1.24 MPa, and 50 g of a 3.8 mass % aqueous solution of ammonium persulfate was added to the autoclave through an injection tube to initiate the polymerization. During the reaction, TFE was continuously introduced from the outside of the system to maintain the pressure under 1.24 MPa. When the amount of introduction of TFE from the initiation of the reaction reached 49 g, unreacted TFE was discharged out of the system to complete the polymerization.

To the obtained latex of a fluoropolymer, 600 g of C6H was added, followed by stirring for 30 minutes, and the latex was left at rest for separation, and a layer comprising C6H was separated and removed to remove unreacted $CF_2=CFOCF_2CF_2CO_2CH_3$ remaining in the latex. A 10 mass % sulfuric acid aqueous solution was added to the latex to agglomerate a fluoropolymer, which was further washed with methanol and dried to obtain a powder of a fluoropolymer.

Further, in the same polymerization as above, polymerization was completed when the amount of introduction of TFE reached 182 g or 273 g, followed by the same treatment after the reaction as above to obtain powders of a fluoropolymer. The ion exchange capacities of the obtained respective fluoropolymers were measured, whereupon the ion exchange capacities of the fluoropolymers obtained in cases of the amount of introduction of TFE of 49 g, 182 g and 273 g were respectively 0.98 meq/g dry resin, 0.95 meq/g dry resin and 0.93 meq/g dry resin. Thus, the ion exchange capacity was decreased as the amount of introduction of TFE was increased.

Comparative Example 4

The same polymerization as in Comparative Example 3 was carried out, and when the amount of introduction of TFE from the initiation of the reaction reached 215 g, unreacted TFE was discharged out of the system to complete the polymerization. To the slurry thus obtained, methanol was added to agglomerate and separate a polymer, which was then washed and dried to obtain a powder of a fluoropolymer.

The ion exchange capacity of the obtained fluoropolymer was measured, whereupon it was 0.95 meq/g dry resin, and TQ was 250° C.

Further, using the obtained fluoropolymer, an ion exchange membrane was prepared and evaluated, whereupon the current efficiency one week after the initiation of the electrolysis was 96.6%. Then, the sodium chloride aqueous solution was changed to the above-described sodium chloride aqueous solution containing iodine ions and barium ions, and electrolysis was carried out for ten days, whereupon the current efficiency was decreased to 89.4%.

Comparative Example 5

The same polymerization as in Comparative Example 4 was carried out except that the TFE pressure was changed to 1.16 MPa, to obtain a powder of a fluoropolymer having an ion exchange capacity of 1.02 meq/g dry resin and a TQ of 242° C.

Further, using the obtained fluoropolymer, an ion exchange membrane was prepared and evaluated. Electrolysis was carried out for one week, and the sodium chloride aqueous solution was changed to the above-described sodium chloride aqueous solution containing iodine ions and barium ions, and then electrolysis was carried out for 10 days, whereupon the current efficiency was so low as 94.5%.

The polymerization conditions and the evaluation results of the fluoropolymers and the ion exchange membranes in the above Examples and Comparative Examples are shown in Table 1.

In Table 1, "-" means unmeasured.

TABLE 1

| Examples and Comparative examples | Ex. | | | | | | | | | |
|---|---|---|---|---|---|---|---|---|---|---|
| | 1 | 2 | 3 | 4 | 5 | 6 | 7 | 8 | 9 | 10 |
| Polymerization scale (L) | 0.2 | 1.0 | 0.2 | 0.2 | 0.2 | 0.2 | 1.0 | 1.0 | 1.0 | 20.0 |
| Polymerization pressure (MPa) | 1.20 | 1.22 | 0.97 | 1.05 | 1.05 | 1.05 | 1.18 | 1.12 | 1.18 | 1.09 |
| Polymerization medium | C6H | C6H | C6H | C6H | C4 ethane | C6 ethane | C6H | C6H | C6H | C6H |

TABLE 1-continued

| Examples and Comparative examples | Ex. | | | | | | | | | |
|---|---|---|---|---|---|---|---|---|---|---|
| | 1 | 2 | 3 | 4 | 5 | 6 | 7 | 8 | 9 | 10 |
| Type of monomer | A | B | C | B | B | B | B | B | B | B |
| Addition of monomer | All at once | Continuous | Continuous | All at once | All at once | All at once | Continuous | Continuous | Continuous | Continuous |
| TQ value (° C.) | 247 | 252 | 208 | 244 | 201 | 191 | 242 | 230 | — | 232 |
| Ion exchange capacity (meq/g dry resin) | 0.86 | 0.94 | 0.97 | 0.93 | 0.92 | 0.95 | 0.99 | 1.04 | 0.95 | 1.02 |
| Anion diffusion coefficient ($\times 10^{-8}$ cm$^2$/sec) | — | 0.90 | — | — | — | — | 1.47 | 2.83 | — | — |
| Current efficiency (%) after one week with usual salt solution | — | — | — | — | — | — | — | — | — | 96.4 |
| Current efficiency (%) after ten days with salt solution containing iodine and barium | — | — | — | — | — | — | — | — | — | 95.8 |

| Examples and Comparative examples | Comp. Ex. | | | | |
|---|---|---|---|---|---|
| | 1 | 2 | 3 | 4 | 5 |
| Polymerization scale (L) | 1.0 | 1.0 | 2.5 | 2.5 | 2.5 |
| Polymerization pressure (MPa) | 1.22 | 1.12 | 1.24 | 1.24 | 1.16 |
| Polymerization medium | AE-3000 | AE-3000 | Emulsion* | Emulsion* | Emulsion* |
| Type of monomer | B | B | B | B | B |
| Addition of monomer | Continuous | Continuous | All at once | All at once | All at once |
| TQ value (° C.) | 245 | 241 | — | 250 | 242 |
| Ion exchange capacity (meq/g dry resin) | 0.95 | 0.98 | 0.98-0.93 | 0.95 | 1.02 |
| Anion diffusion coefficient ($\times 10^{-8}$ cm$^2$/sec) | 1.72 | 2.80 | — | — | — |
| Current efficiency (%) after one week with usual salt solution | — | — | — | 96.6 | 94.5 |
| Current efficiency (%) after ten days with salt solution containing iodine and barium | — | — | — | 89.4 | — |

Monomer
A: $CF_2=CFOCFCF(CF_3)OCF_2CF_2COOCH_3$
B: $CF_2=CFOCF_2CF_2CF_2COOCH_3$
C: $CF_2=CFOCF_2CF_2CF_2OCF_2CF_2COOCH_3$
Emulsion*: polymerization reaction carried out by emulsion polymerization.

The relation between the ion exchange capacity and the anion diffusion coefficient in Examples 2, 7 and 8 and Comparative Examples 4 and 5 is shown in FIG. 1.

From comparison of the ion exchange capacity and the anion diffusion coefficient between Examples 2, 7 and 8 and Comparative Examples 1 and 2, it is confirmed that the fluoropolymers obtained in Examples 2, 7 and 8 have a smaller anion diffusion coefficient at the same ion exchange capacity than the fluoropolymers obtained in Comparative Examples 1 and 2.

Further, a decrease in the current efficiency when iodine atoms are added is small in Example 10 but is remarkable in Comparative Example 4, and accordingly it is found that a decrease in the current efficiency by impurities is suppressed in the ion exchange membrane in Example 10.

Further, in Example 9 in which the perfluorovinyl ether compound was continuously added, the ion exchange capacity of the polymer being formed was constant even during the polymerization, whereas in Comparative Example 3 in which the perfluorovinyl ether compound was added all at once, the ion exchange capacity of the polymer being formed was reduced as the polymerization proceeded. Thus, it is found that the distribution of the ion exchange capacity of the obtained polymer is small when a monomer of a perfluorovinyl ether compound is successively added.

INDUSTRIAL APPLICABILITY

The process for producing a fluoropolymer of the present invention is an industrially useful process for producing a fluoropolymer, since a polymerization medium having very small ozone depletion potential and very small global warming potential is used, and a fluoropolymer having excellent properties and particularly useful as a material of an ion exchange membrane can be obtained.

The entire disclosure of Japanese Patent Application No. 2008-117372 filed on Apr. 28, 2008 including specification, claims, drawings and summary is incorporated herein by reference in its entirety.

What is claimed is:

1. A process for producing a fluoropolymer, which comprises polymerizing a fluoromonomer having at least one fluorine atom and having a carboxylic acid type functional group selected from the group consisting of —COOH, —CN, —COF, —COOR$^1$, —COOM and —COONR$^2$R$^3$ in its molecule wherein R$^1$ is a C$_{1-10}$ alkyl group and each of R$^2$ and R$^3$ are independently H or a C$_{1-10}$ alkyl group and M is an alkali metal or a quaternary ammonium salt group and a fluoroolefin having at least one fluorine atom in its molecule using a hydrofluorocarbon as a medium, wherein the hydrofluorocarbon has 4 to 10 carbon atoms and has a ratio (molar basis) of the number of hydrogen atoms/the number of fluorine atoms of from 0.05 to 20 which has a continuous reaction step of successively adding the fluoromonomer having a carboxylic acid type functional group to the hydrofluorocarbon for reaction.

2. The process for producing a fluoropolymer according to claim 1, wherein the fluoromonomer having a carboxylic acid type functional group is a perfluorovinyl ether represented by the following formula (1):

$$CF_2=CF-(O)_p-(CF_2)_q-(CF_2CFX)_r-(O)_s-(CF_2)_t-(CF_2CFX')_u-A \quad (1)$$

wherein each of X and X' which are independent of each other, is a fluorine atom (F) or a trifluoromethyl group (CF$_3$), A is a carboxylic acid type functional group, p is 0 or 1, q is an integer of from 0 to 12, r is an integer of from 0 to 3, s is 0 or 1, t is an integer of from 0 to 12, and u is an integer of from 0 to 3, provided that $1 \leq p+s$ and $1 \leq r+u$.

3. The process for producing a fluoropolymer according to claim 1, wherein the fluoroolefin is tetrafluoroethylene.

4. The process for producing a fluoropolymer according to claim 1, wherein the hydrofluorocarbon is a compound represented by the formula $C_{n+m}F_{2n+1}H_{2m+1}$ (wherein n is an integer of from 2 to 8, and m is an integer of from 0 to 3).

5. The process for producing a fluoropolymer according to claim 1, wherein the hydrofluorocarbon is at least one member selected from the group consisting of 1,1,1,2,2,3,3,4,4,5,5,6,6-tridecafluorohexane, 1,1,1,2,2,3,3,4,4-nonafluorohexane and 1,1,1,2,2,3,3,4,4,5,5,6,6-tridecafluorooctane.

6. The process for producing a fluoropolymer according to claim 1, wherein the fluoroolefin is at least one fluoroolefin selected from the group consisting of tetrafluoroethylene, chlorotrifluoroethylene, vinylidene fluoride, a vinyl fluoride and hexafluoropropylene.

7. The process for producing a fluoropolymer according to claim 1, further comprising polymerizing at least one copolymerizable monomer selected from the group consisting of $CF_2=CF_2-R^f$, $CF_2=CF-OR^f$ and $CF_2=CFO(CF_2)_vCF=CF_2$ where $R^f$ is a C$_{1-10}$ perfluoroalkyl group and v is an integer of from 1 to 3.

8. The process for producing a fluoropolymer according to claim 1, wherein said hydrofluorocarbon has a boiling point within the range of 0 to 200° C.

9. The process for producing a fluoropolymer according to claim 1, wherein an amount of said hydrofluorocarbon is from 0.01 to 20 times the mass of said fluoromonomer having a carboxylic acid type functional group.

10. The process for producing a fluoropolymer according to claim 1, wherein a ratio of fluoromonomer having a carboxylic acid type functional group to said fluoroolefin is 15 to 95 mass %.

11. The process for producing a fluoropolymer according to claim 1, wherein a ratio of fluoromonomer having a carboxylic acid type functional group to said fluoroolefin is 20 to 80 mass %.

12. The process for producing a fluoropolymer according to claim 1, wherein a ratio of fluoromonomer having a carboxylic acid type functional group to said fluoroolefin is 20 to 60 mass %.

13. The process for producing a fluoropolymer according to claim 1, wherein flurooolefin and fluoromonomer having a carboxylic acid type functional group are each successively added so as to maintain a constant concentration of each monomer.

14. The process for producing a fluoropolymer according to claim 1, wherein said polymerization is conducted at a pressure of at least 0.05 MPaG.

15. The process for producing a fluoropolymer according to claim 1, wherein said polymerization is conducted at a pressure of at most 2.0 MPaG.

16. The process for producing a fluoropolymer according to claim 1, wherein said polymerization is conducted at a temperature of from 20 to 90° C.

17. The process for producing a fluoropolymer according to claim 1, wherein polymerization is initiated with from 0.0001 to 3 parts by mass, based on 100 parts by mass of all monomers, of a polymerization initiator.

18. The process for producing a fluoropolymer according to claim 1 wherein the ion exchange capacity of the fluoropolymer is from 0.8 to 1.3 meq/g dry resin.

19. A fluorinated ion exchange membrane, comprising a membrane made of a fluoropolymer having carboxylic acid type functional groups obtained by the production process as defined in claim 1.

20. The fluorinated ion exchange membrane according to claim 19, wherein the anion diffusion coefficient of the membrane made of a fluoropolymer having carboxylic acid type functional groups is from $1 \times 10^{-9}$ to $1 \times 10^{-7}$ cm$^2$/sec.

* * * * *